UNITED STATES PATENT OFFICE.

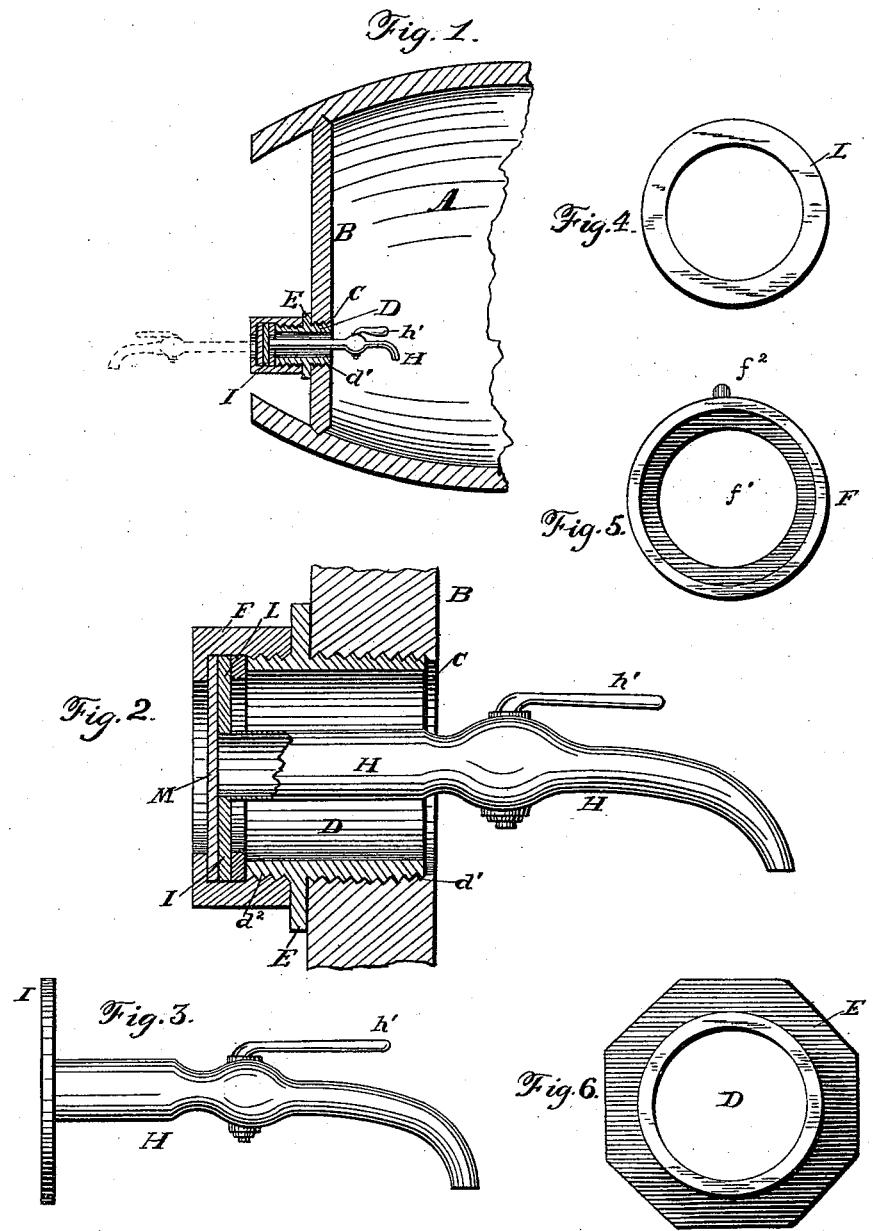

EMIL F. DIETERICHS, OF CLEVELAND, OHIO.

FAUCET AND BUNG.

SPECIFICATION forming part of Letters Patent No. 438,611, dated October 21, 1890.

Application filed April 1, 1890. Serial No. 346,210. (No model.)

*To all whom it may concern:*

Be it known that I, EMIL F. DIETERICHS, residing at Cleveland, in the county of Cuyahoga and State of Ohio, have invented certain new and useful Improvements in Faucets and Bungs, of which the following is a specification, reference being had therein to the accompanying drawings.

This invention refers to faucet-bungs for barrels, casks, and the like.

The object of the invention is to produce a bung or bushing for barrels, casks, and other vessels, in which a faucet or cock may be placed so that the faucet will be inclosed within the barrel for shipment, but may be quickly reversed and applied for use.

In the drawings, Figure 1 is a longitudinal section, partly in elevation, of the bung, cap, and faucet, the outer or operative position being shown in dotted lines. Fig. 2 is a section of bung or bushing and connections, the faucet being shown partly in elevation and partly broken away. Fig. 3 is a side elevation of faucet. Fig. 4 is a face view of washer; Fig. 5, an inside view of cap; Fig. 6, an end view of bung or bushing.

A indicates the barrel, and B the head thereof. The head has a hole C, in which a bushing D may be screwed. The hollow cylindrical bushing D has a flange E of polygonal outline, so that a wrench may be applied, and the screw-threaded portion $d'$ may be screwed into the barrel-head until the flange E finds a seat against the outer face of the barrel-head, as shown in Figs. 1 and 2. The outer end $d^2$ of the bushing is screw-threaded. An open cap F may be screwed into said portion $d^2$ of the bushing.

A cock or faucet H has a flange I at its base, said flange being too large to pass through the opening in the bushing D, but the body of the cock, including its operating-handle, being of such size as to pass through the bushing. The operating-lever H' may be turned down nearly parallel with the body of the cock, as shown, so as to enable the cock to pass through the bushing. The opening $f'$ in the cap F is also large enough to pass the body of the cock.

The cock H may be applied with its flange I bearing on the outer end of the bushing D and the body extending either inside the barrel through bushing D or projecting outwardly, as shown in dotted lines, Fig. 1, and the cap F, screwed into the bushing outside of said flange I, will hold the cock in either of its adjusted positions.

To make tight joints, it is desirable to have one or a number of washers L (of rubber, leather, fiber, soft metal, or other suitable material) interposed between the end of the bushing D and the flange I of the cock.

When the cock is turned so that it extends into the barrel, the lever or handle thereof is not accessible from outside the barrel, and so there is little liability of the cock coming open; but to prevent leakage in case the cock is open, and also to keep dirt out of the body of the faucet, it is desirable to apply a disk or plate M within cap F whenever the cock is turned in. When the cock is turned so as to extend outwardly, this disk may be removed and a washer, like L, substituted for it, or if the plate be of leather or soft metal its central portion may be cut away, and it will then become a washer to be applied between the flange I and the bushing or between the flange and cap.

I have designed this improvement specially for use with oil-barrels; but it may be used with other barrels. The cap F should not project beyond the chine of the barrel when the cock is turned inward. The cap F may be roughened externally or otherwise adapted for the application of a wrench, as by a projecting boss $f^2$, or by making the outer surface polygonal, or in any other usual way for constructing screw-caps.

A cock constructed in this manner can be applied to a barrel at small expense and can be shipped without danger of loss or breakage, the cock being readily changed from its stored position inside the barrel to its operative position without the loss of time. The cock can be conveniently placed when the barrel stands on end with head B uppermost.

What I claim is—

1. The combination, with the head of a barrel, cask, or the like, of a bushing in said head, having one end projecting, a cock having a body capable of passing through the bushing, but with a flange larger than the hole in the bushing, and a cap encircling the flange of the cock and engaging the end of the bushing, so as to connect the flange of the cock thereto, substantially as described.

2. A bushing for a bung-hole, having a screw-threaded portion at each end and a polygonal flange between the ends, a cock having a body of such size as to pass through the bushing, but with an end flange too large to pass said bushing, and a perforated cap adapted to pass the body of the cock, but to engage the flange on the cock and the body of the bushing and hold the faucet in either of its positions, in combination substantially as described.

3. In a bung-faucet, the combination of the bushing having a screw-threaded body and projecting flange, the faucet having body of a size to pass through the bushing and an end flange to rest against the bushing, a packing-washer and closing-disk in proximity to said faucet-flange, and a confining-cap engaging the bushing and holding the faucet and packing in place in either adjusted position of the faucet, all substantially as described.

In testimony whereof I affix my signature in presence of two witnesses.

EMIL F. DIETERICHS.

Witnesses:
G. S. HATCH,
FRANK HEPPENSACK.